United States Patent

Fukushima et al.

[11] Patent Number: 5,678,420
[45] Date of Patent: Oct. 21, 1997

[54] WASTE INCINERATION HEAT CONVERSION SYSTEM

[75] Inventors: Toshiko Fukushima, Tsuchiura; Yasuo Koseki, Hitachiota; Akinobu Hayashi; Ryuichi Kaji, both of Tokyo, all of Japan

[73] Assignee: Hitachi, Ltd., Tokyo, Japan

[21] Appl. No.: 547,579

[22] Filed: Oct. 24, 1995

[30] Foreign Application Priority Data

Oct. 25, 1994 [JP] Japan ............................ 6-259981

[51] Int. Cl.$^6$ ................................................ F25B 27/02
[52] U.S. Cl. .......................... 62/238.6; 60/648; 237/2 B
[58] Field of Search .......................... 62/238.6, 238.7; 237/2 B; 60/648

[56] References Cited

U.S. PATENT DOCUMENTS

| | | | |
|---|---|---|---|
| 4,523,438 | 6/1985 | Curti | 62/238.6 |
| 4,682,549 | 7/1987 | Hall | 237/2 B |
| 4,745,768 | 5/1988 | Schorr et al. | 62/238.6 |
| 4,751,823 | 6/1988 | Hans | 62/238.6 |
| 4,754,614 | 7/1988 | Yuyama | 62/238.6 |
| 4,873,840 | 10/1989 | Gilliusson | 62/238.6 |
| 4,882,903 | 11/1989 | Lowry, Jr. et al. | 60/39.182 |

FOREIGN PATENT DOCUMENTS

| | | |
|---|---|---|
| 272031 | 6/1988 | European Pat. Off. . |
| 563482 | 10/1993 | European Pat. Off. . |
| 2501842 | 9/1982 | France . |

*Primary Examiner*—William E. Tapoical
*Attorney, Agent, or Firm*—Antonelli, Terry, Stout & Kraus, LLP.

[57] ABSTRACT

A waste incineration heat conversion system has an incinerator for burning waste discharged from an installation, a heat recovering section for recovering the heat generated by combustion of the waste in the incinerator, a cold generating section for generating cold by utilizing the thus recovered heat, and a pipe line for conveying the thus generated cold to the installation so that the thus conveyed cold is utilized in the installation for a purpose.

18 Claims, 17 Drawing Sheets

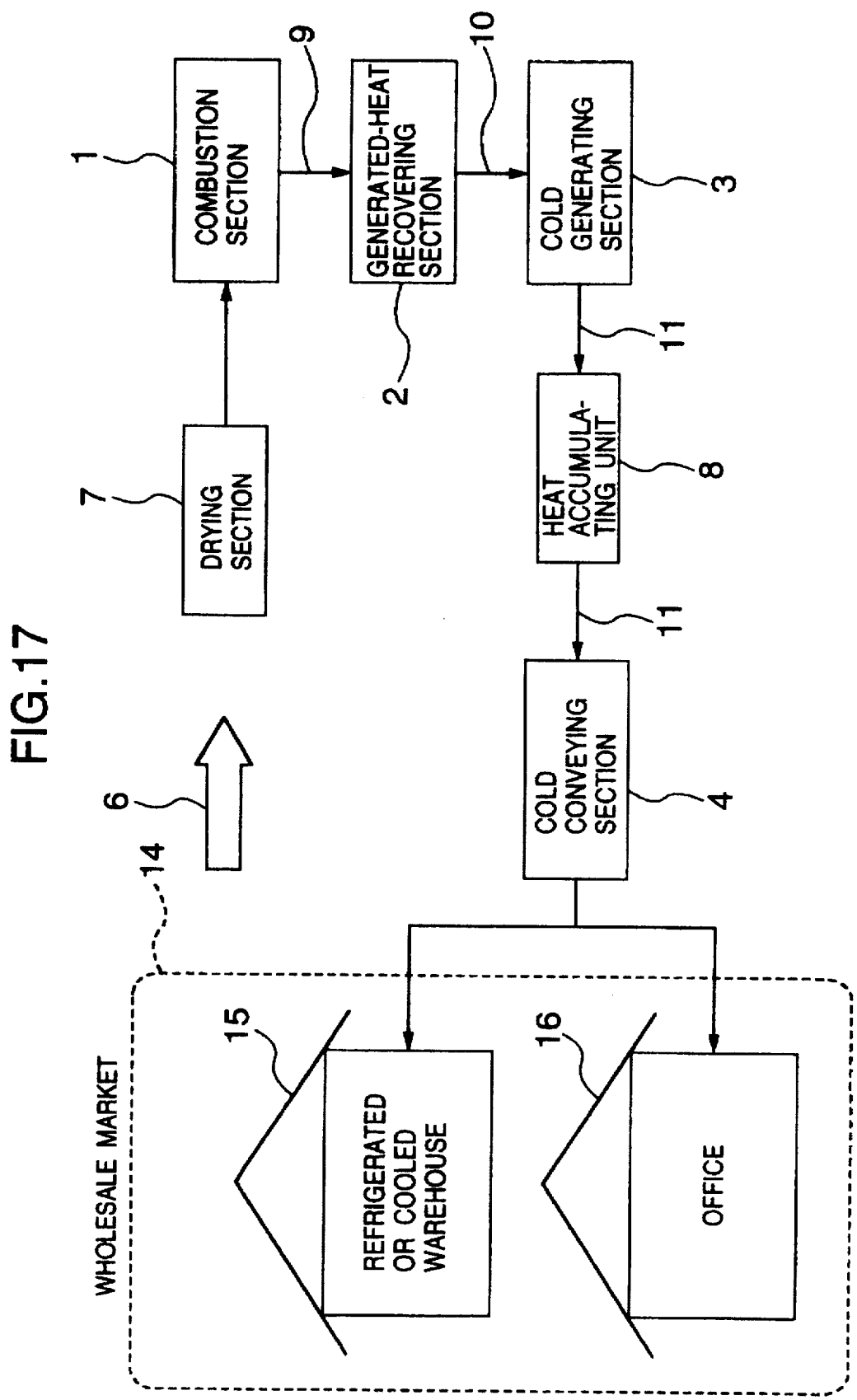

WASTE INCINERATION HEAT CONVERSION SYSTEM

BACKGROUND OF THE INVENTION

The present invention relates to a waste incineration heat conversion system, and more particularly, to a system for generating cold by utilizing thermal energy obtainable by incineration of combustible or flammable wastes exhausted from manufacturing processes so that the generated cold can be used in manufacturing processes.

DESCRIPTION OF THE PRIOR ART

The combustible wastes from manufacturing processes are recycled or disposed of. As general disposal ways, there are consignment to an agent or trader and provision of incineration equipment. However, with a view to saving the consignment fee to the agent, there is a tendency that the incineration equipment is provided to perform the incineration disposal. In addition, as disclosed in Japanese Unexamined Patent Publication No. 5-288327, there is a known method in which steam is generated by the help of heat developed in the incineration disposal of the combustible wastes so as to be employed in manufacturing processes or used as a heat source for absorption refrigerators to cool buildings.

The foregoing prior techniques involve exhausting heat generated in incineration disposal of combustible wastes without utilization, utilizing the heat to generate steam for use in manufacturing processes, or utilizing the heat as a heat source for absorption refrigerators to cool buildings. On the other hand, cold generally takes charge of cooling, storage and the like of products in the manufacturing processes. However, the generation of cold needs a large amount of energy, which does not satisfy the requirements for energy savings.

SUMMARY OF THE INVENTION

The present invention has its object to utilize combustible waste produced in and discharged from an installation, such as a product manufacturing factory or a market building, to save the energy needed to generate heat used in the installation.

In order to achieve the object, the present invention provides a waste incineration heat conversion system for use with an installation in which combustible waste is produced. The system comprises:

means for burning combustible waste discharged from the installation;

means for recovering the heat generated by combustion of the combustible waste;

means for generating cold by utilizing at least a part of the thus recovered heat; and means for conveying at least a part of the thus generated cold to a part of the installation so that the thus conveyed cold is used in the installation for a purpose.

The combustible waste discharged from the installation is incinerated by the waste burning means of the system of the invention to generate heat which is directly or indirectly recovered by the heat recovering means as a thermal energy. At least a par of the thus recovered thermal energy is fed to the cold generating means operable by the thus fed thermal energy to generate cold. At least a part of the thus generated cold is conveyed by the cold conveying means to a part of the installation from which the waste is discharged, whereby the thus conveyed part of the cold can be effectively utilized in the installation for a purpose. Accordingly, the present invention provides an advantage that waste, such as industrial waste produced in and discharged from a factory, may be disposed, by incineration, by the manufacture and the heat generated by the incineration of the waste may be converted into cold which can be effectively utilized by the manufacturer.

The combustible waste may be one which is produced in a product manufacturing step carried out in the installation and the cold thus conveyed to the installation may be used to cool products produced in the product manufacturing step. The product manufacturing step may be a step of manufacturing foodstuff, for example.

The installation may be a brewing plant and the combustible waste may comprise combustible brewer's grains and sludge discharged from the brewing plant. Means for drying the waste may preferably be disposed upstream of the waste burning means and the cold conveyed to the brewing plant may be utilized to cool at least one of wort cooler, fermentation tank and beer storage tank of the brewing plant.

The installation may alternatively be a market building in which at least one kind of vegetable and fruits, marine products, and flesh and meat is sold. In this case, the combustible waste comprises remainders in the market. Preferably, means for drying the waste may be disposed upstream of the waste burning means and the cold conveyed to the market building may be utilized to cool food in at least one refrigerator in the market building.

In the past, the remainders in markets were simply disposed or simply incinerated. The present invention makes it possible to utilize such waste to generate cold which can be utilized to cool foods in refrigerators used in markets, whereby the invention advantageously saves the consumption of energy.

Waste discharged from a foodstuff manufacturing process contains as much as 70 to 80 wt % of water even after the waste has been subjected to a water-removing treatment. The drying means disposed upstream of the burning means is effective to reduce or remove the water content of the waste to be fed to the burning means to thereby increase the calories of the heat generated by the combustion of the waste with a resultant increase in the cold generated by the cold generating means.

The combustible waste may be one produced in a product manufacturing step carried out in the installation and the cold generating means may generate the cold of a temperature level not higher than 5° C. or not higher than 0° C. The cold thus conveyed to the installation may be used to cool sections of the installation at different temperature levels. Preferably, means for drying the waste may be disposed upstream of the waste burning means.

One preferred embodiment of the invention includes means disposed downstream of the cold generating means for accumulating the cold generated by the cold generating means so that the cold generated may be accumulated or stored by the cold accumulating means until the cold is required.

The heat recovering means may comprise a boiler operative to generate steam.

The cold generating means may comprise a steam turbine driven by the thus generated steam and a turbo refrigerator driven by the steam turbine. Alternatively, the cold generating means may comprise an absorption type refrigerating machine operative with a refrigerant formed by ammonia.

Alternatively, the cold generating means may comprise an absorption type refrigerating machine operative with an HFC based refrigerant. Further alternatively, the cold generating means may comprise an absorption type refrigerating machine operative with a refrigerant formed by a mixture of water and lithium bromide.

The absorption type refrigerating machine may include an absorber containing a solution of lithium bromide, an evaporator containing water as a refrigerant, and means including a solution pump for pumping the solution of lithium bromide from the absorber to an inlet of the evaporator so that the lithium bromide solution is mixed with the water in the evaporator to lower the freezing point of the refrigerant.

Further alternatively, the cold generating means may comprise an adsorption type refrigerating machine operative with an adsorbent formed by one of silica gel and zeolite and a refrigerant formed by ethanol.

The cold conveying means may be so structured as to convey a part of the cold generated by the cold generating means to a part of the installation and convey the rest of the cold generated by the cold generating means to another part of the installation so that the thus conveyed parts of the cold are used for different purposes.

The cold generating means may be designed to utilize a part of the heat recovered by the heat recovering means and a heat conveyor may be provided to convey the rest of the heat recovered by the heat recovering means to the installation. Thus, a part of the heat recovered by the heat recovering means may be fed by the heat conveyor either to a part of the installation where the heat is needed or to a product manufacturing step. The rest of the heat recovered by the heat recovering means may be utilized to generate cold which can be fed to the installation for cooling purpose, for example.

The above and other objects, features and advantages of the present invention will become more apparent from the following description with reference to the accompanying drawings.

BRIEF DESCRIPTION OF THE DRAWINGS

FIG. 17 shows a modification to the embodiment of the waste incineration heat conversion system shown in FIG. 16.

DESCRIPTION OF THE PREFERRED EMBODIMENTS

A detailed description will be made hereinbelow of embodiments of the present invention with reference to the drawings.

A first embodiment of this invention will be described in conjunction with FIGS. 1 to 9.

Figure 1:
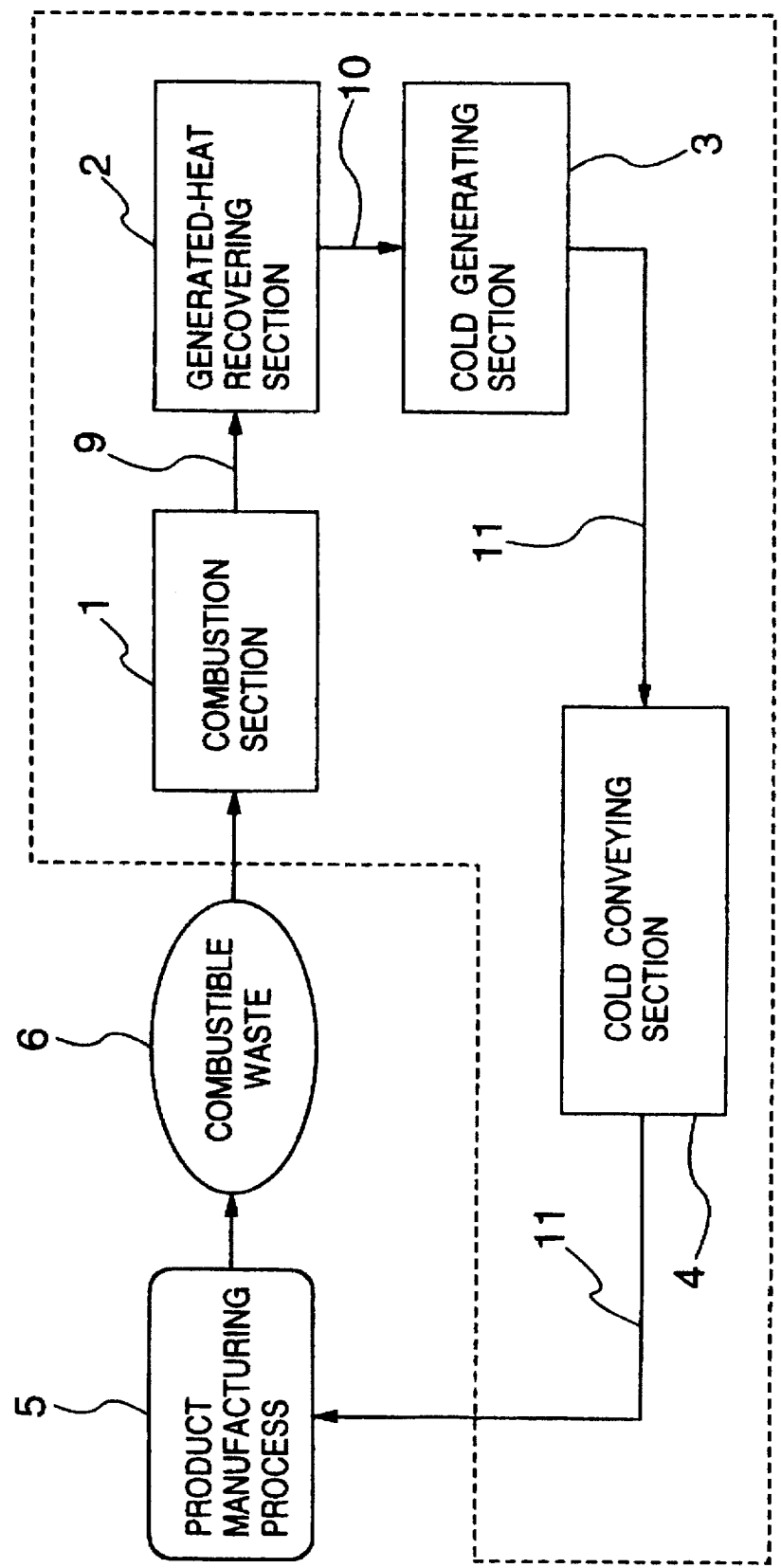
FIG. 1 is a diagrammatic illustration of an embodiment of the waste incineration heat conversion system according to the present invention.

FIG. 1 is an illustration of one example of a waste incineration heat conversion system employed in a manufacturing process, wherein the portion surrounded by dotted lines is the waste incineration heat conversion system. In FIG. 1, combustible waste 6 exhausted from a product manufacturing process 5 advances to a combustion section 1 so as to be incinerated therein. The heat 9 generated due to the incineration is recovered in a generated-heat recovering section 2 and then supplied as a thermal energy 10 to a cold generating section 3. This cold generating section 3 utilizes this thermal energy 10 to generate cold 11. The cold 11 is transferred through a cold conveying section 4 to the product manufacturing process 5 so as to be used for cooling and storage of the products.

Figure 2:
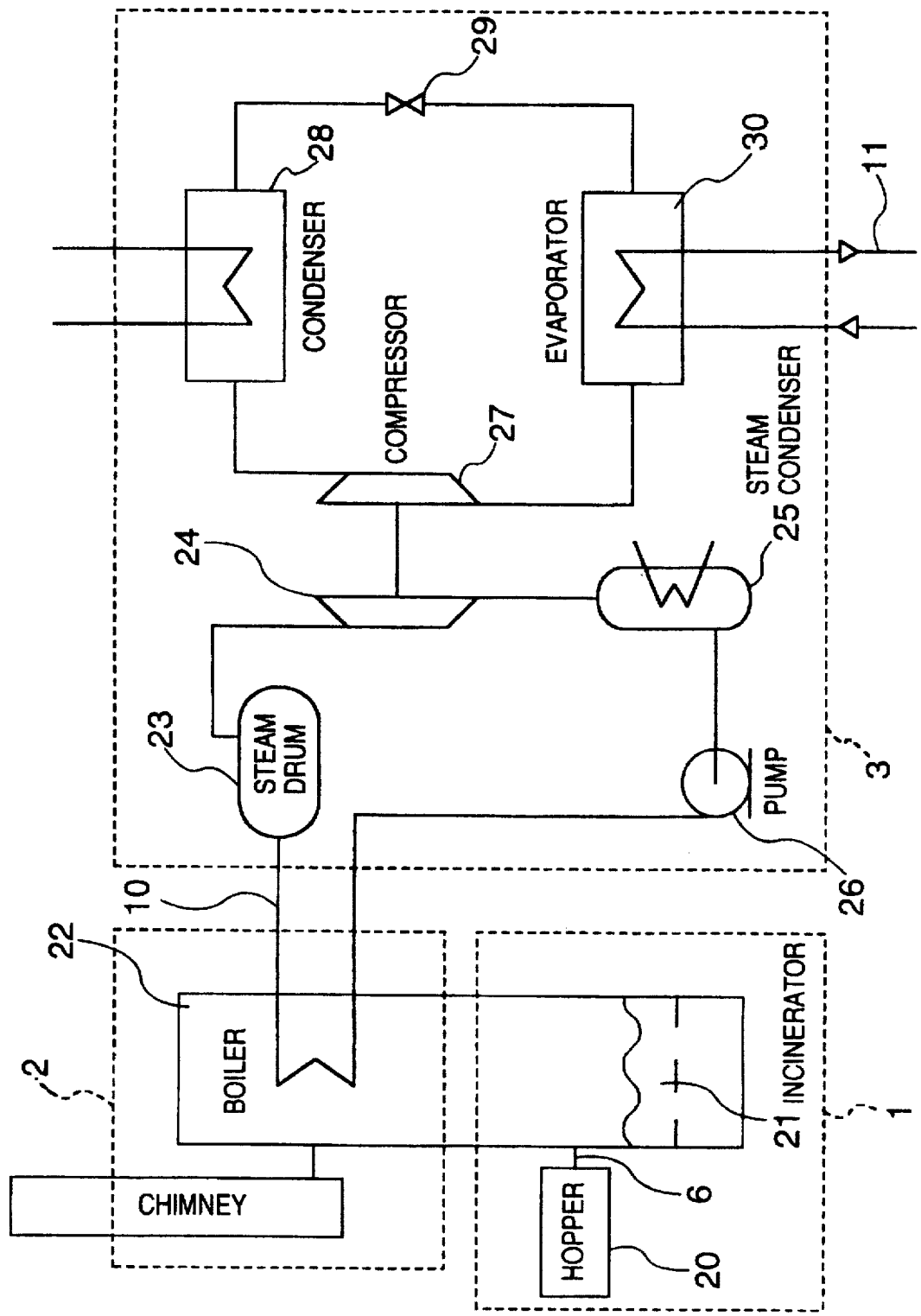
FIG. 2 is a diagrammatic illustration of a practical example of the embodiment shown in FIG. 1 wherein a cold heat generating system is formed by a refrigerator driven by a steam turbine.

The combustion section 1, the generated-heat recovering section 2 and the cold generating section 3 are constructed as shown in FIG. 2. The combustion section 1 is composed of an incinerator 21 for the combustible wastes 6. The generated-heat recovering section 2 comprises a boiler 22. The cold generating section 3 comprises a steam drum 23, a turbine 24, a steam condenser 25, a pump 26, pipings for establishing communications among them, a compressor 27, a condenser 28, a restriction 29, an evaporator 30 and pipings for making communications among them.

The combustible wastes are put in a hopper 20 and then fed into the incinerator 21. The heat generated by the combustion of the combustible wastes 6 generates a thermal energy in the form of steam 10 in the boiler 22. This steam is delivered through the steam drum 23 to the turbine 24 so that the turbine 24 comes into operation. The steam is expanded in the turbine 24 and turns into water by means of the steam condenser 25. The water is again delivered by the pump 26 to the boiler 22. When the turbine 24 drives the compressor 27 of a steam compression type refrigerator, the refrigerant such as a Flon is compressed in the compressor 27, cooled and liquefied in the condenser 28, pressure-reduced in the restriction 29, and evaporated in the evaporator 30. At this time, a quantity of heat equivalent to the evaporation latent heat is absorbed from the refrigerant to generate the cold 11. The turbine 24 is selected from an axial flow type, a radial type, a screw type, and other types. In addition, the compressor 27 is also selected from a centrifugal type and a screw type taking the capacity into consideration. Because the turbine 24 drives the compressor 27 directly without any generator and motor interposed therebetween, the system of the invention can eliminate the loss caused when the turbine 24 drives the compressor 24 through a generator and a motor.

Figure 3:
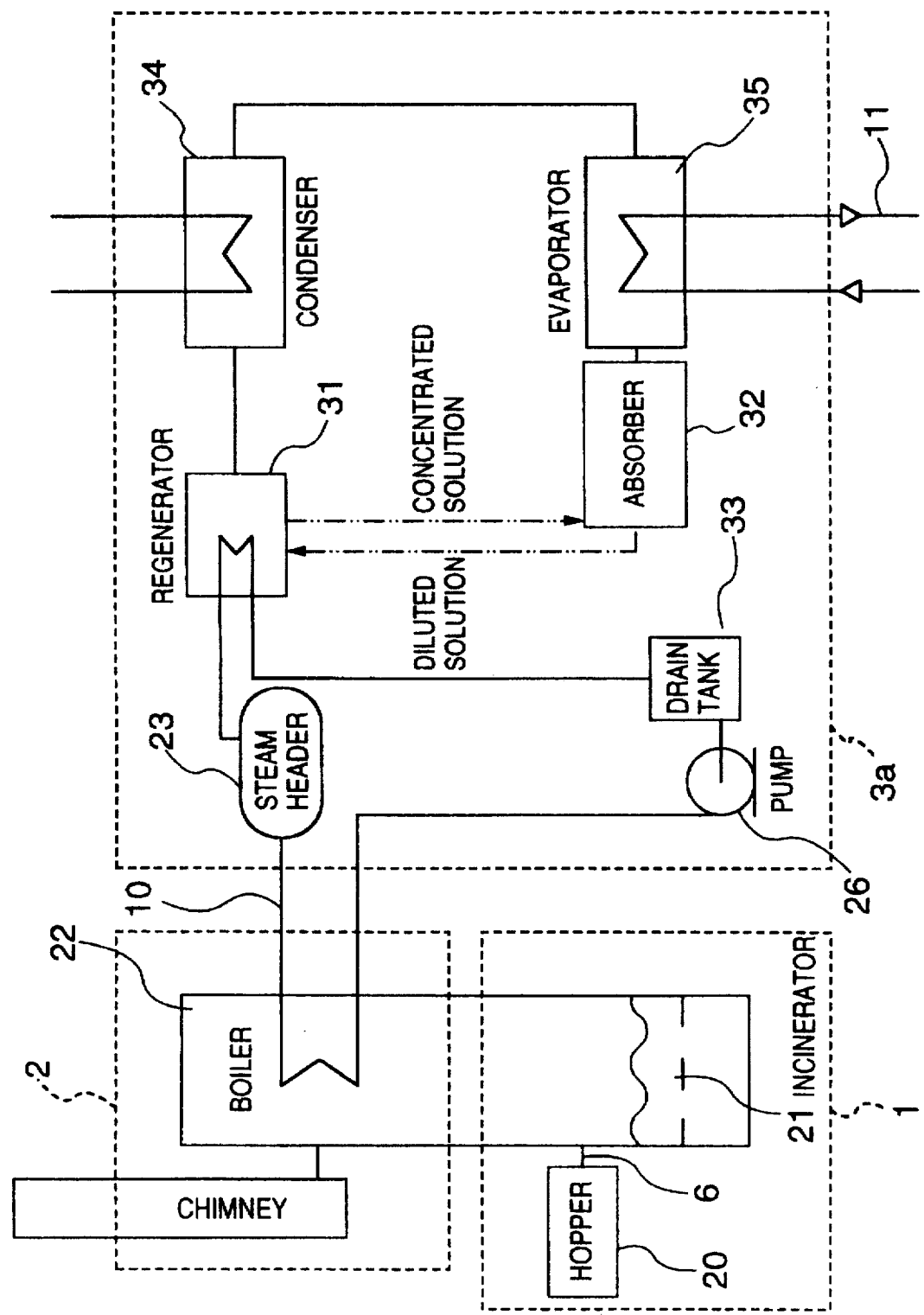
FIG. 3 is a diagrammatic illustration of another practical example of the embodiment of the waste incineration heat conversion system shown in FIG. 1 wherein the cold heat generating system is formed by an absorption type refrigerator.

FIG. 3 shows a modification 3a to the cold generating section 3. In FIG. 3, the combustion section 1 and the generated-heat recovering section 2 have structures similar to those in the FIG. 2 arrangement, but the cold generating section 3a is composed of an absorption refrigerator. As in the FIG. 2 arrangement, the combustible wastes 6 are incinerated in the combustion section 1 and thermal energy 10 is generated in the form of steam in the generated-heat recovering section 2. The steam is led to a regenerator 31 of the absorption refrigerator so as to heat a dilute (weak) solution diluted with a refrigerant. The heated diluted solution discharges the refrigerant and is concentrated. The concentrated solution is returned to an absorber 32. On the other hand, the refrigerant emitted from the diluted solution in the regenerator 31 is cooled and liquefied in a condenser 34 and then supplied to an evaporator 35 where a quantity of heat equivalent to the evaporation latent heat is taken from the refrigerant during the evaporation to generate cold 11. The evaporated refrigerant is absorbed into the concentrated solution within the absorber 32 to dilute the solution. In the regenerator 31, the steam is cooled into liquid phase and returned through a drain tank 33 and a water pump 26 into the boiler 22.

According to the example shown in FIG. 3, in the case of generating cold of a temperature below 0° C. if LiBr is used as the absorbing solution and water is used as the refrigerant, the refrigerant is frozen to make the absorption refrigerator inoperable. For this reason, it is preferable that water is employed as the absorbing solution and ammonia is employed as the refrigerant, or, alternatively, an organic medium is used as the absorbing solution and an HFC-based refrigerant is used as the refrigerant. In this instance, the refrigerant can contribute the generation of cold 11 below 0° C. without refrigeration.

Figure 4:
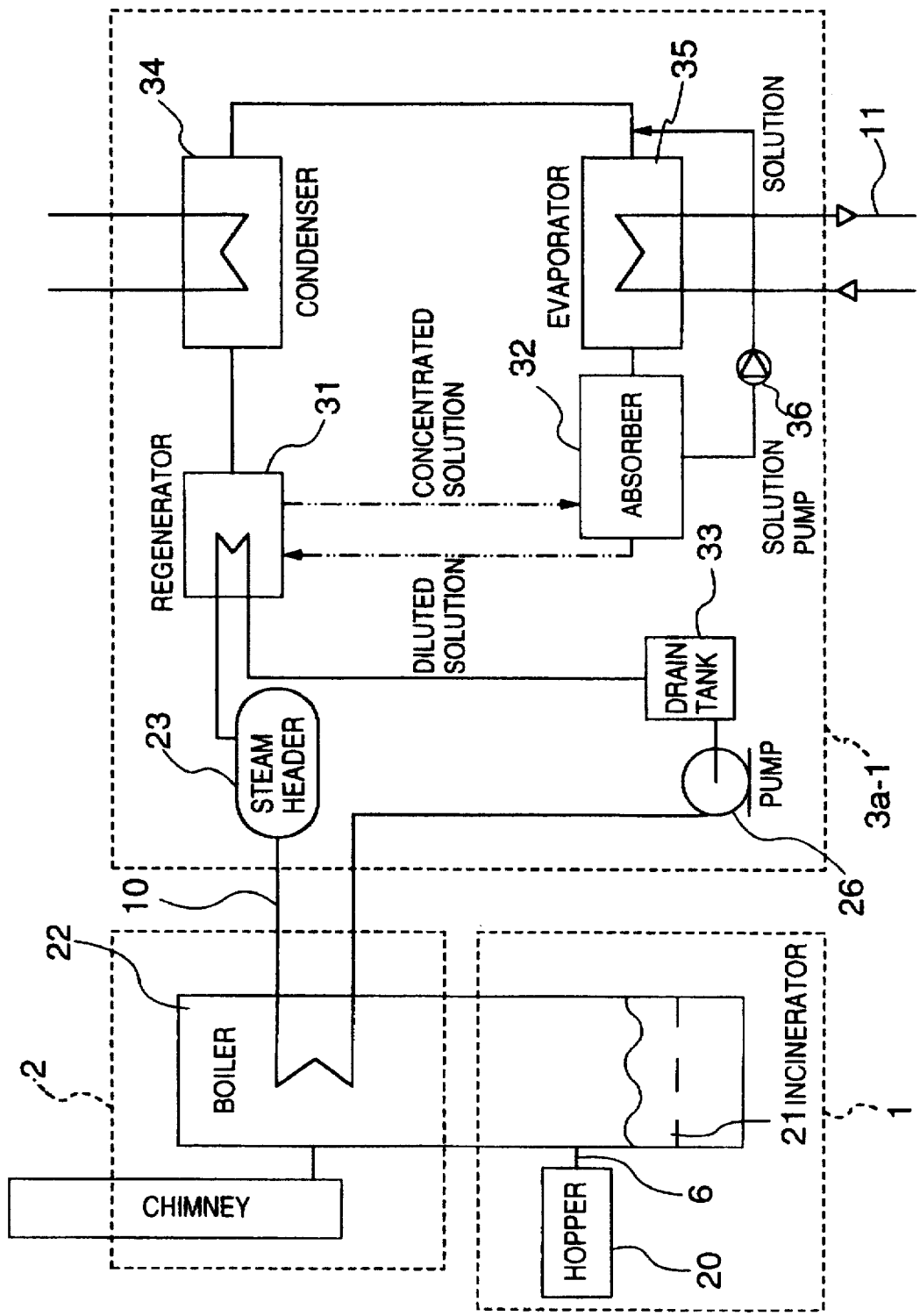
FIG. 4 shows a modification to the embodiment shown in FIG. 3.

FIG. 4 illustrates a modification 3a-1 of the arrangement 3a shown in FIG. 3. The FIG. 4 modification is an absorption refrigerator in which LiBr is employed as the absorbing solution and water is employed as the refrigerant to generate cold below 0° C. In this modification 3a-1, LiBr which is the solution in an absorber 32 is transferred through a solution pump 36 to an inlet of an evaporator 35 so as to be mixed with water which is the refrigerant, so that the freezing point of the refrigerant is lowered to avoid refrigeration thereof.

Figure 5:
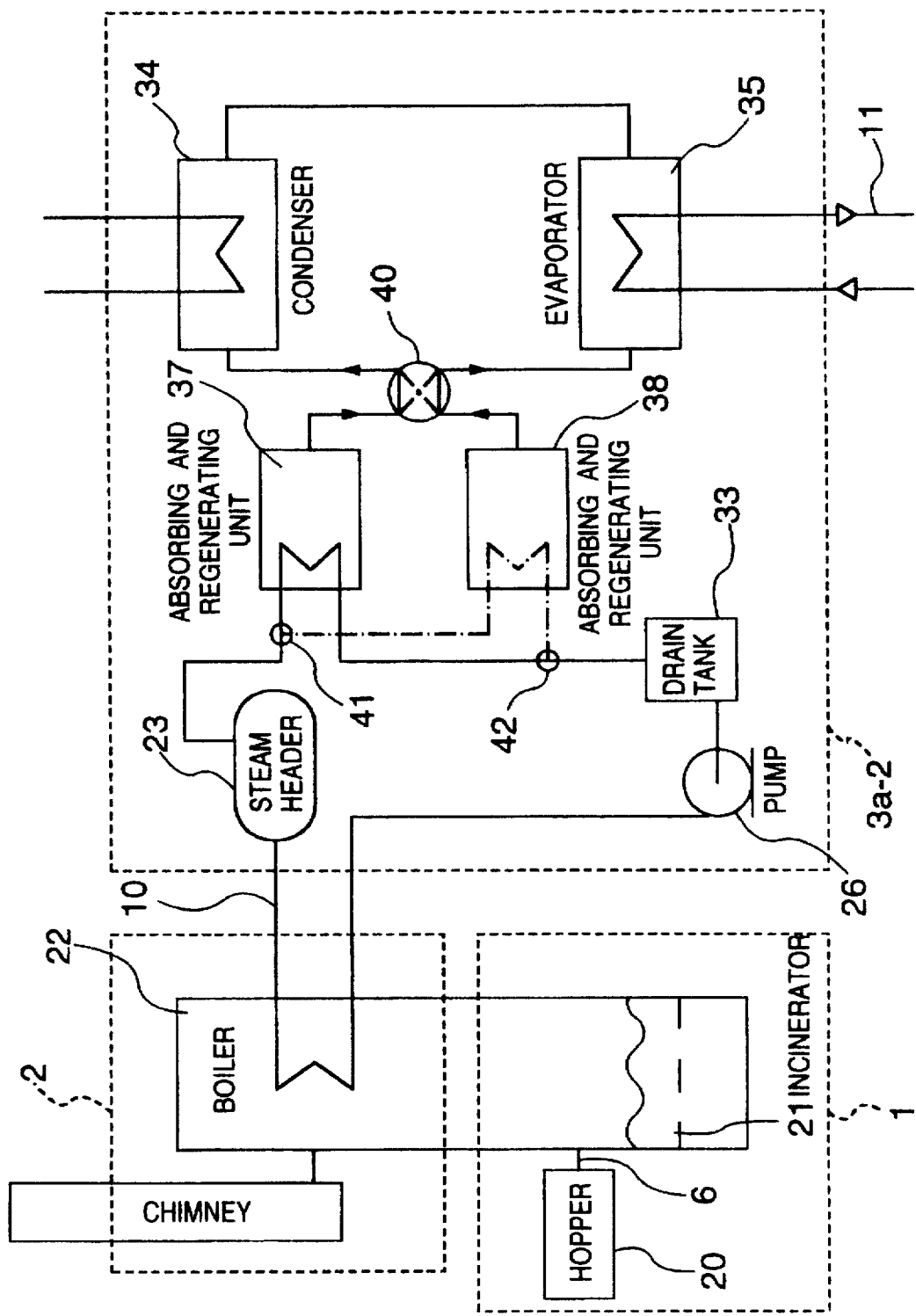
FIG. 5 shows a modification to the embodiment shown in FIG. 3 wherein the cold heat generating system is formed by an adsorption type refrigerator.

FIG. 5 illustrates a second modification 3a-2 of the cold generating section 3. In the example shown in FIG. 5, the combustion section 1 and the generated-heat recovering section 2 have structures similar to those in the arrangement shown in FIG. 2, whereas an adsorption refrigerator serves therein as the cold generating section 3a-2. The adsorption refrigerator is constructed such that the refrigerant evaporated in the evaporator 35 is adsorbed into an adsorbent such as silica gel and zeolite so as to keep up the evaporation of the refrigerant. This adsorbent is stored in two sets of absorbing and regenerating sections 37, 38 each including a heater for the desorption of the adsorbed refrigerant. The two sets of absorbing and regenerating sections 37, 38 are connected such that, when one absorbing and regenerating section 38 absorbs the refrigerant, the other section 37 regenerates the adsorbent by using the steam supplied from a boiler 22. In response to the completion of the regeneration, the 4-way valve 40 and the two 3-way valves 41 and 42 are switched so that the steam and the refrigerant are respectively caused to flow as shown by dashed lines in FIG. 5, so that the adsorbent which has completed the regeneration is now used for the absorption, while the section which has engaged in the absorption now acts to regenerate the adsorbent which absorbed the refrigerant.

Although silica gel or zeolite is generally used as the adsorbent, it is desirable that ethanol is used as the refrigerant to prevent refrigeration. However, even in a case where water is employed as the refrigerant, it is also possible that the water is positively frozen to use the evaporator 35 as a heat accumulating vessel. In this case, a heat accumulator 8, which will be described later, becomes unnecessary.

When the above-described waste incineration heat conversion system is provided in a product manufacturing process, the combustible wastes exhausted and recovered, which have heretofore been disposed of or merely incinerated, can be combusted so that the heat generated by the combustion of the combustible wastes is recovered so as to generate cold which, in turn, is usable in the product manufacturing process. Accordingly, in addition to the disposal of the industrial wastes, energy savings become possible in the product manufacturing process.

Figure 6:
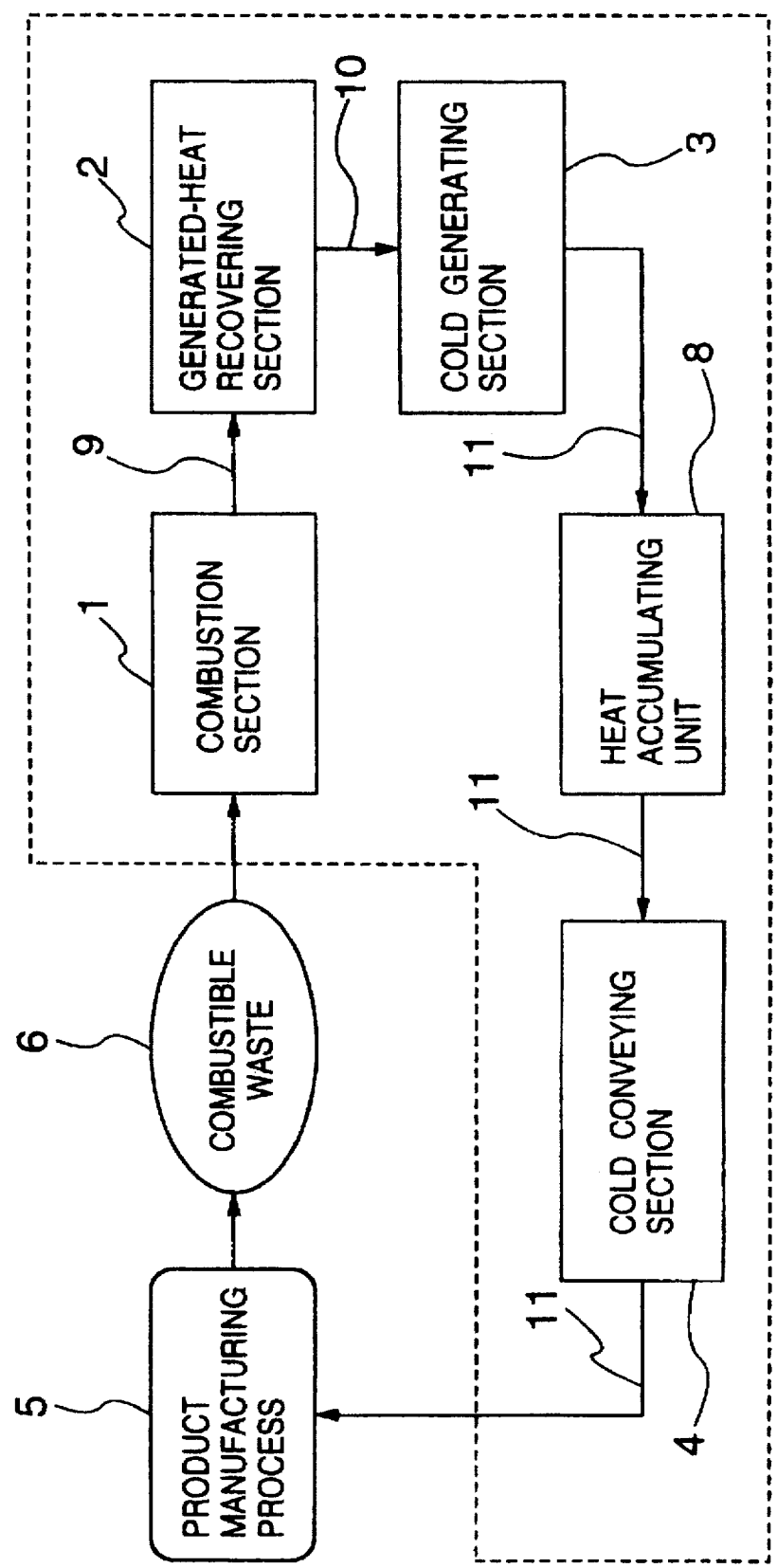
FIG. 6 shows a modification to the embodiment of the waste incineration heat conversion system shown in FIG. 1.

FIG. 6 is an illustration of a modification to the arrangement shown in FIG. 1. In the example shown in FIG. 6, the structure is basically the same as that of FIG. 1 embodiment, but a difference from the FIG. 1 embodiment resides in an addition of a heat accumulator 8 which stores the cold 11 generated in the cold generating section 3. The amounts of the discharged combustible wastes generally vary with the passage of time, with the result that the quantity of the cold 11 generated in the cold generating section 3 also varies. Since the heat accumulator 8 can adjust the difference between the time when a quantity of the cold is needed for the product manufacturing process 5 and the time when a quantity of the cold 11 is generated in the cold generating section 3, the cold 11 produced by the combustion of the combustible wastes 6 can adequately be given to the product manufacturing process 5, whereby the combustible wastes 6 can be effectively used.

Figure 7:
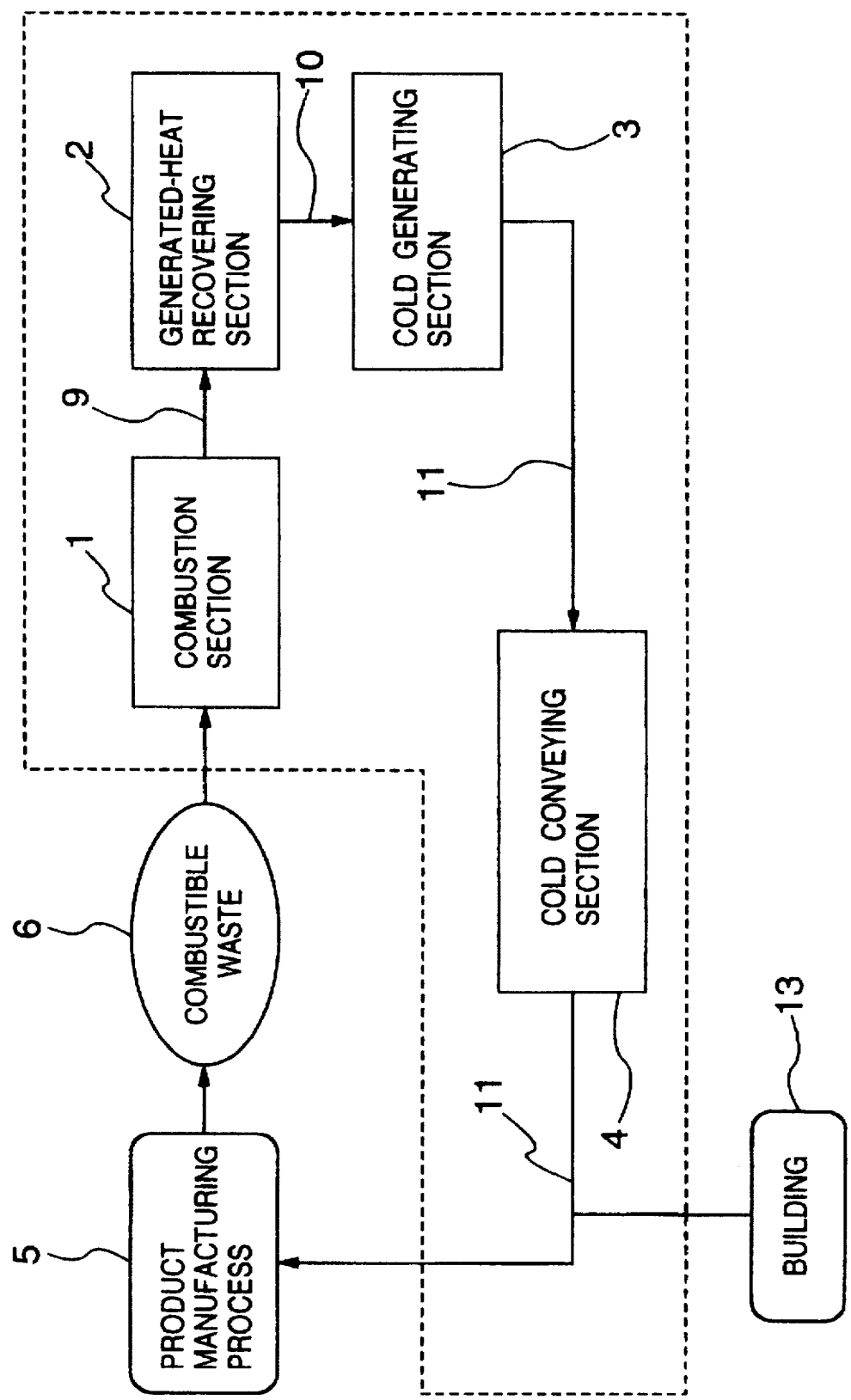
FIG. 7 shows another modification to the embodiment of the waste incineration heat conversion system shown in FIG. 1.

FIG. 7 shows a further modification to the FIG. 1 embodiment, wherein a portion of the cold 11 is branched and supplied to a building 13. This construction allows the portion of the cold 11 to be usable for the cooling of the building 13.

Figure 8:
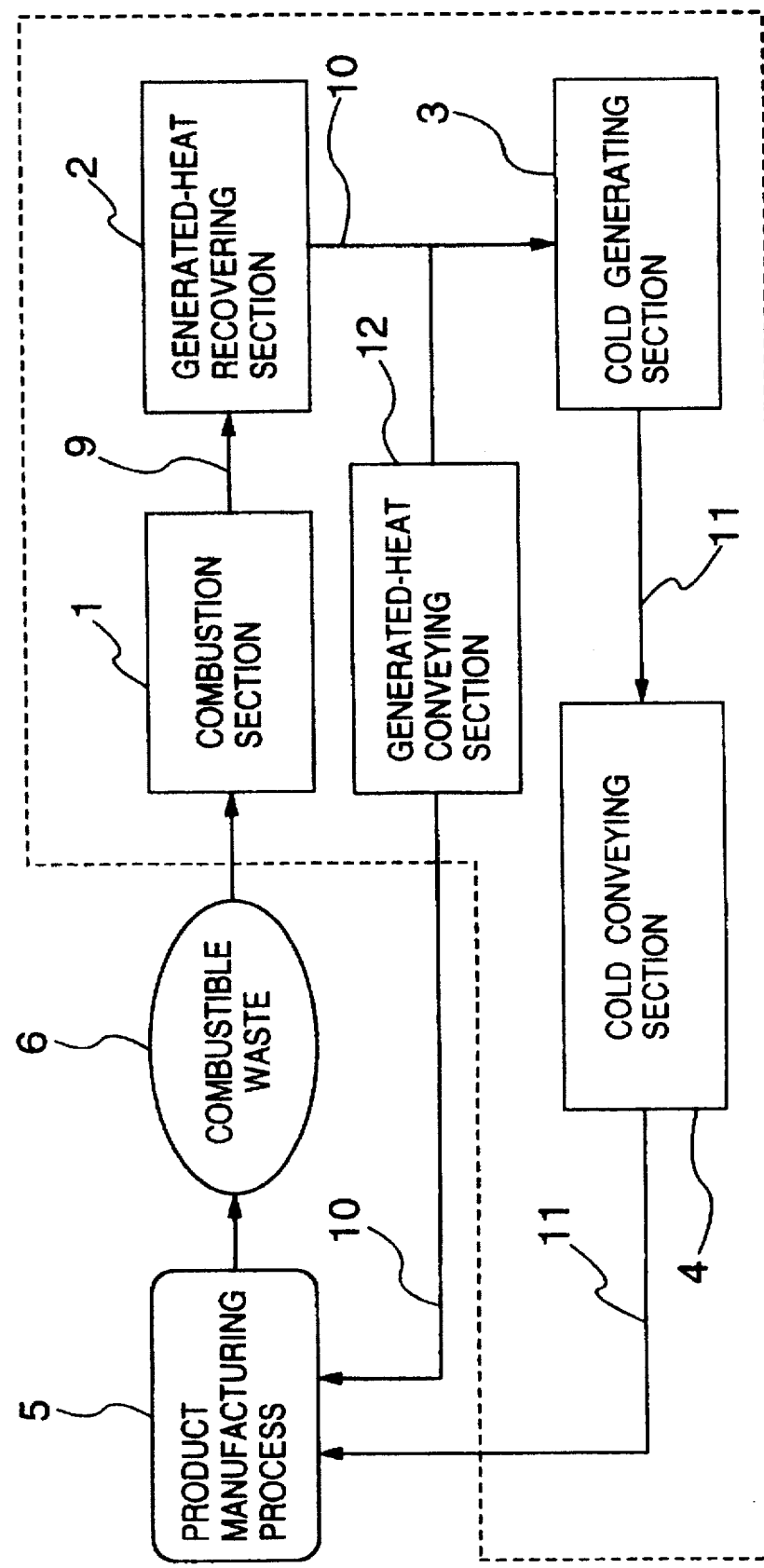
FIG. 8 shows a further modification to the embodiment of the waste heat conversion system shown in FIG. 1.

FIG. 8 illustrates a still further modification to the FIG. 1 embodiment, wherein a portion of the thermal energy 10 obtained by the combustion of the combustible wastes 6 is fed to the product manufacturing process 5. This structure permits the portion of the thermal energy 10 to be given to sections of the product manufacturing process 5 which need the thermal energy.

Figure 9:
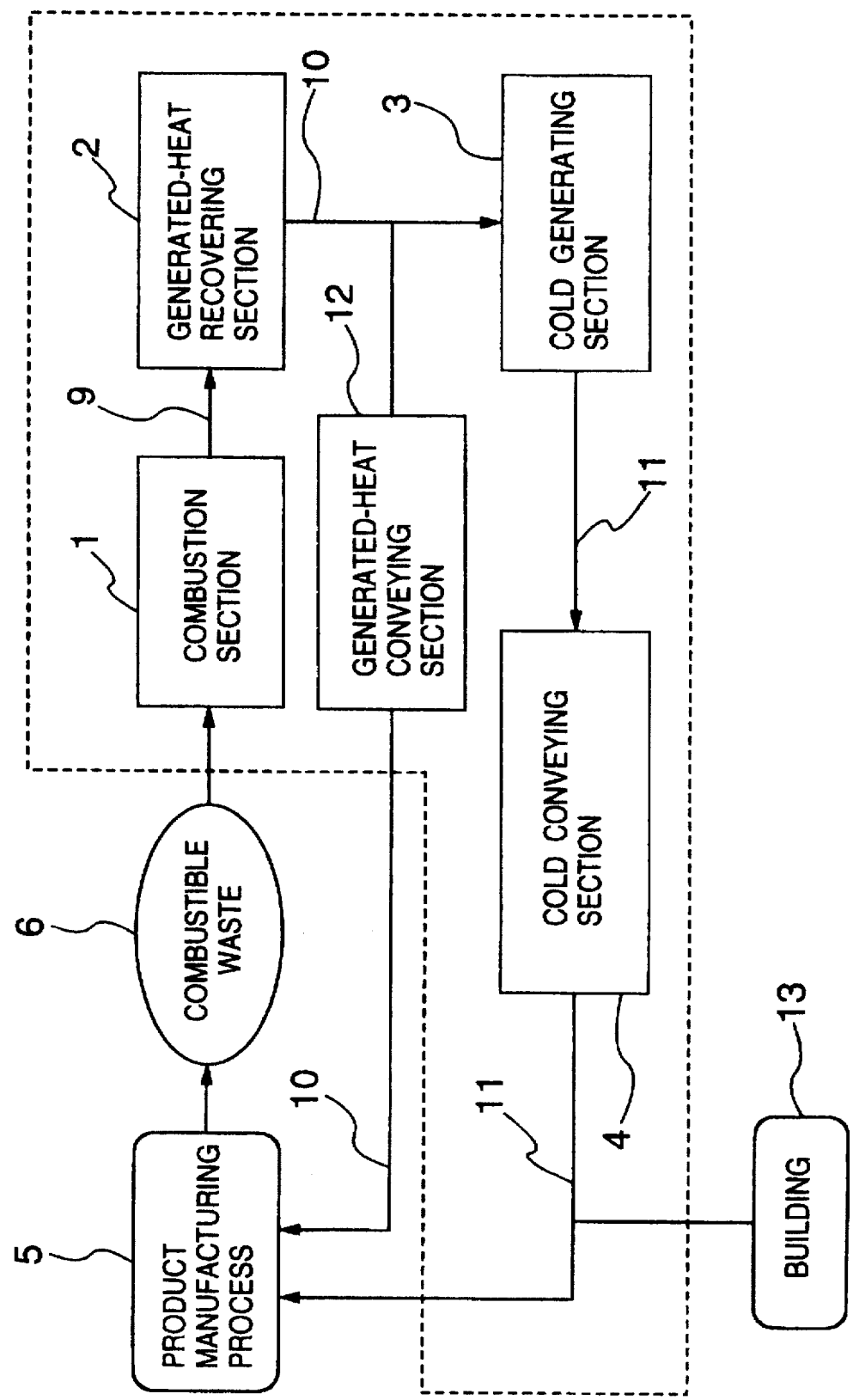
FIG. 9 shows a still further modification to the embodiment of the waste heat conversion system shown in FIG. 1.

Moreover, when the thermal energy 10 obtained by the combustion of the combustible wastes is relatively excessive, as shown in FIG. 9, a portion of the generated thermal energy 10 can be conveyed through a generated-heat conveying section 12 to the product manufacturing process 5 and a portion of the cold 11 generated in the cold generating section 3 can be fed through the cold conveying section 4 to the building 13 so as to be used for cooling.

For applying the cold 11 to a variety of applications in the product manufacturing process 5, the temperature of the cold 11 generated in the cold generating section 3 should preferably be below 5° C. and, more preferably, below 0° C. With such a low temperature, the cold 11 can be utilized for applications of various temperature levels. In addition the difference between the temperature of a medium which transfers the cold 11 in the cold conveying section 4 when the medium takes a forwarding condition and the temperature of the medium when it is in a returning condition, can be set to be large, whereby the flow rate of the cold conveying medium can be reduced to realize a size-reduction of the cold conveying section 4 and the reduction of the cold conveying power.

Figure 10:
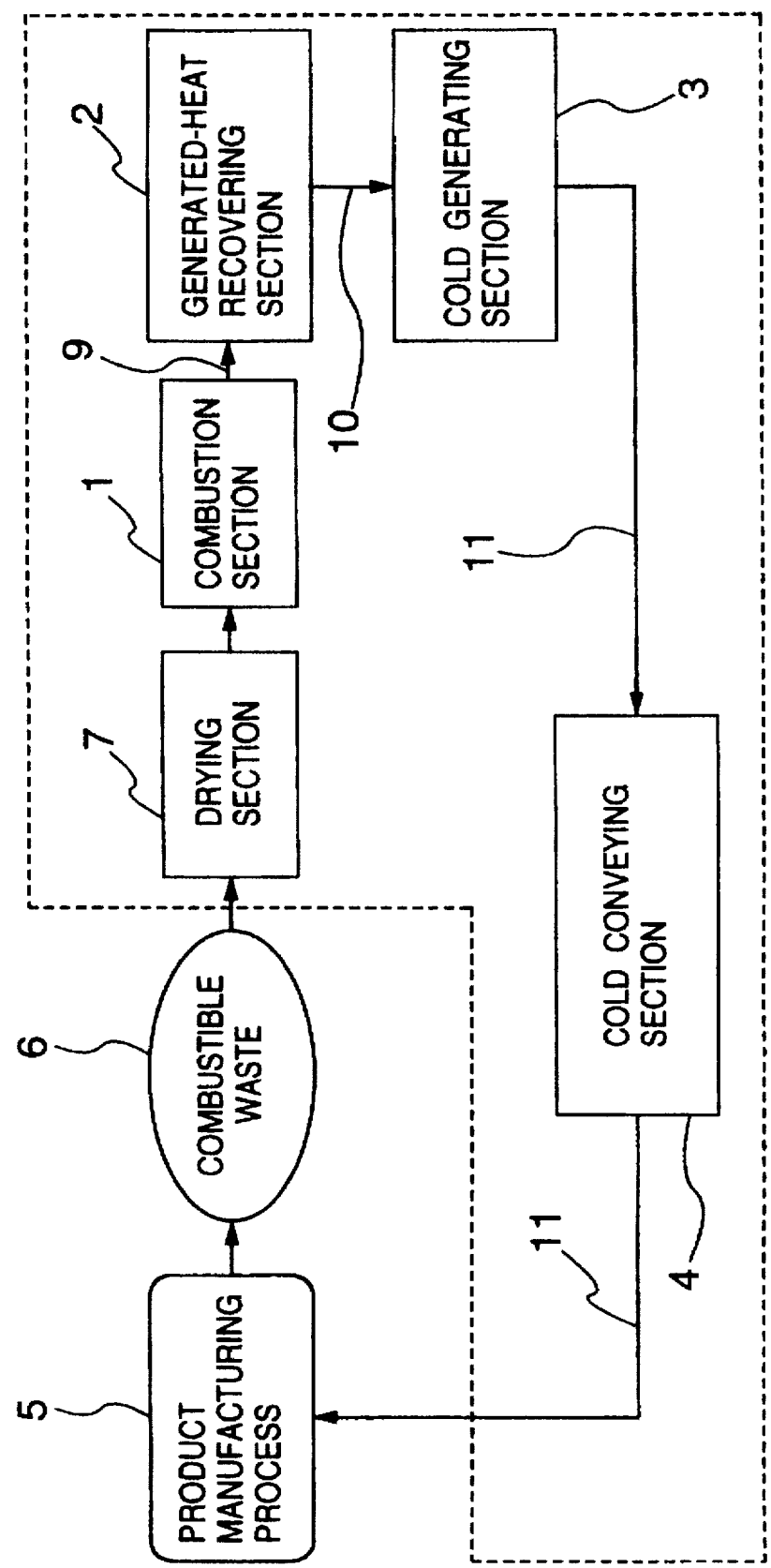
FIG. 10 is a diagrammatic illustration of a second embodiment of the waste incineration heat conversion system according to the present invention.

As shown in FIG. 10, a second embodiment employs an arrangement similar to the FIG. 1 arrangement, except that a drying section 7 for drying the combustible wastes 6 is provided upstream of the combustion section 1. As a rule, the combustible wastes exhausted from food processing processes or the like contain as large as 70 to 80% by weight of water even after the waste have been dewatered. Accordingly, the provision of the drying section 7 upstream of the combustion section 1 allows the combustible wastes 6 to be dried before the incineration in the combustion section 1, so that the quantity of heat to be generated in the combustion section 1 increases, with the result that the generated quantity of the cold 11 also increases.

Figure 11:
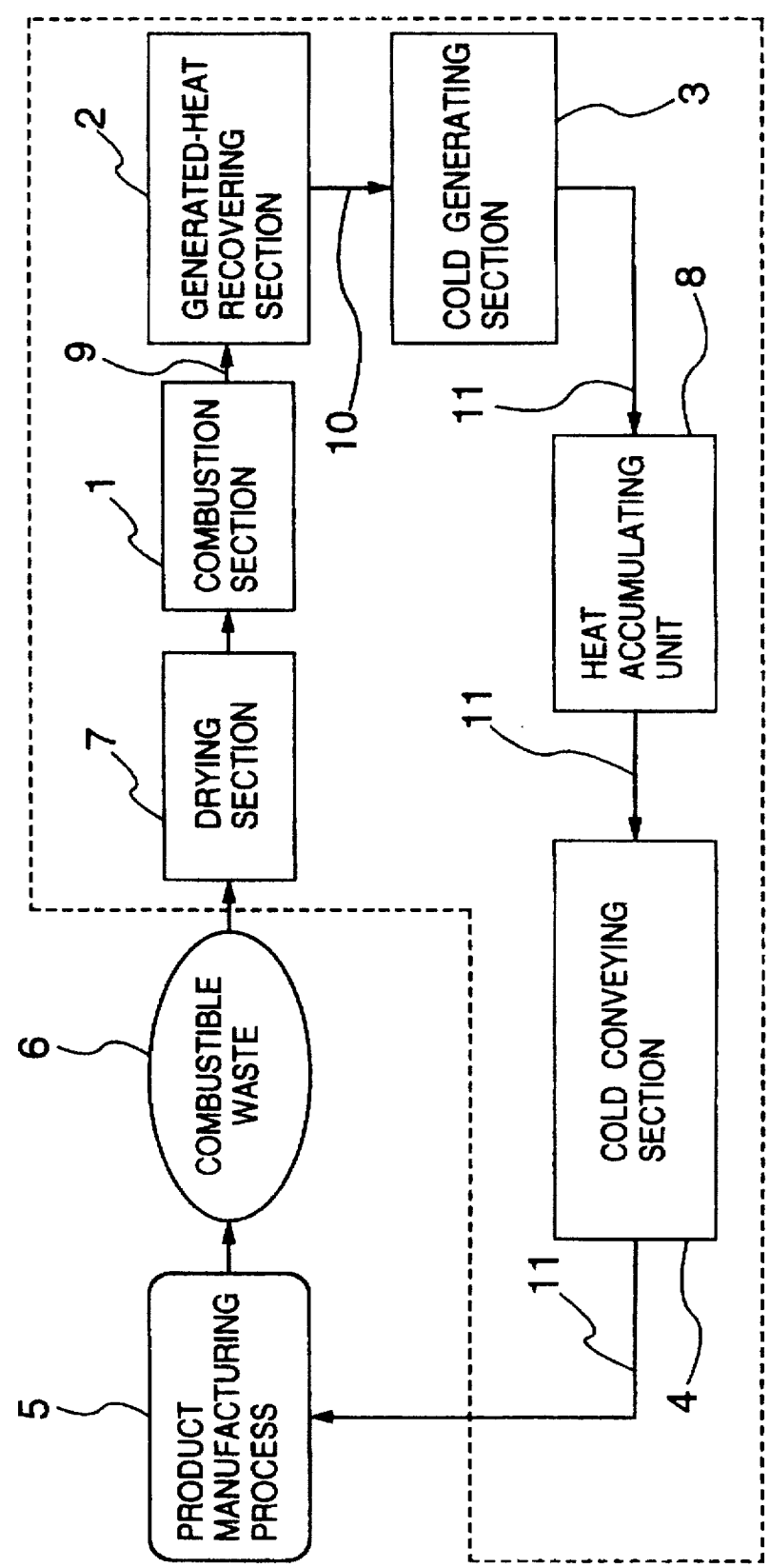
FIG. 11 shows a modification to the embodiment of the waste incineration heat conversion system shown in FIG. 10.

Referring to FIG. 11, in addition to the drying section 7 provided upstream of the combustion section 1, a heat accumulating section 8 is further provided in order to store the cold 11 generated in the cold generating section 3. The provision of the heat accumulating section 8 can adjust the difference between the time when a quantity of the cold is required for the product manufacturing process 3 and the time when a quantity of the cold 11 is generated in the cold generating section 3, thus making it possible to more effectively utilize the energy of the combustible wastes 6.

Figure 12:
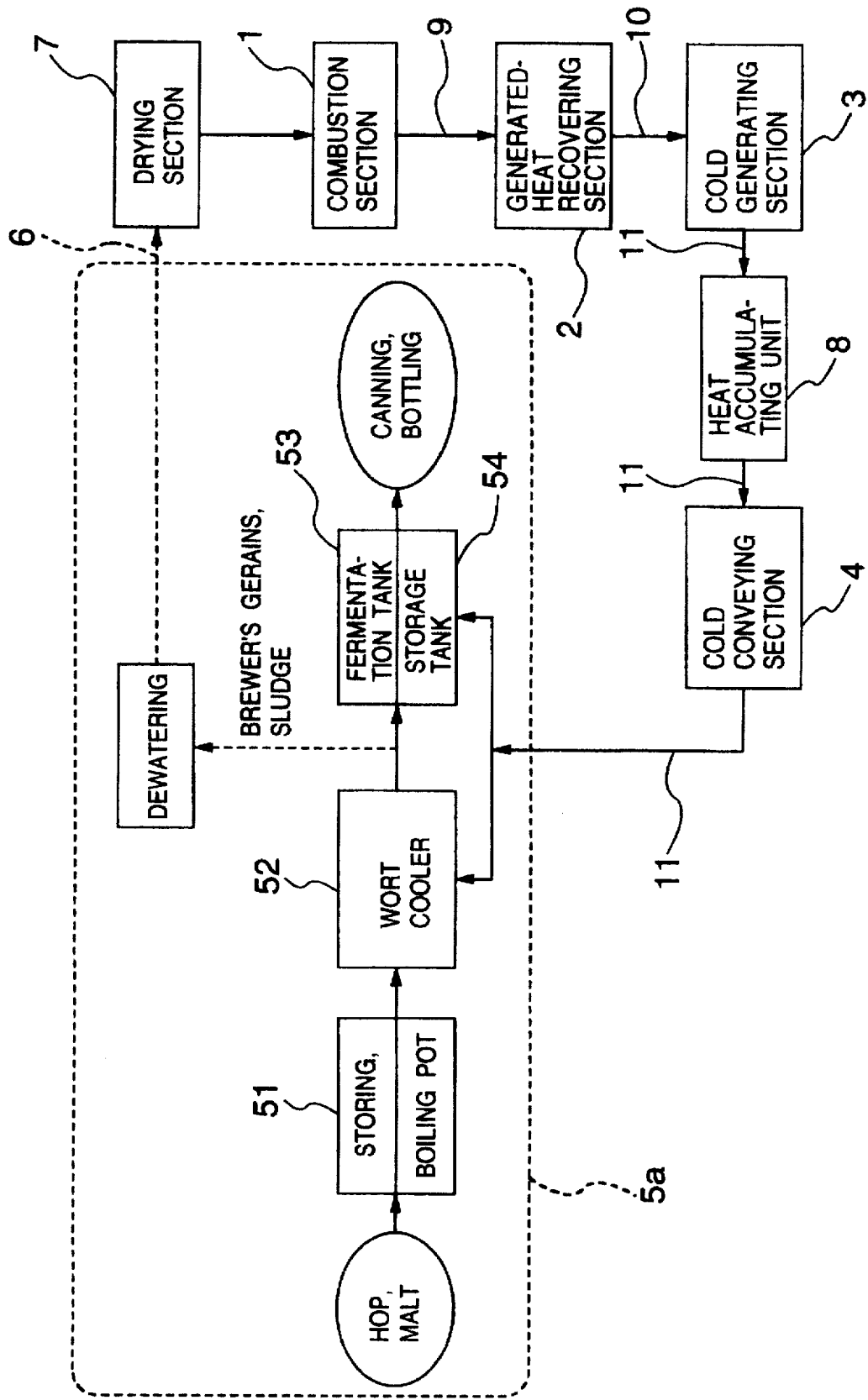
FIG. 12 is a diagrammatic illustration of a third embodiment of the waste incineration heat conversion system according to the present invention.
Figure 14:
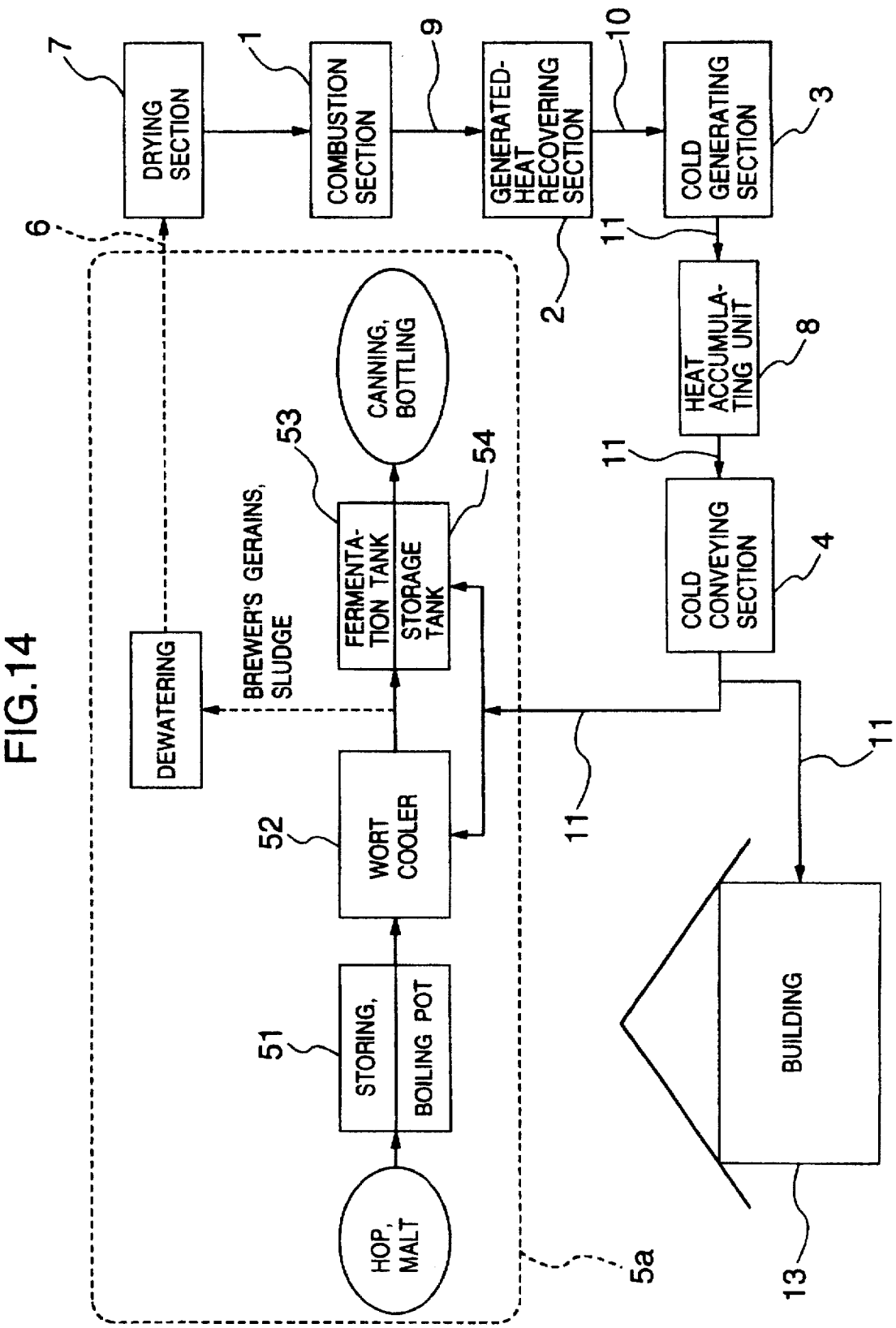
FIG. 14 shows another modification to the embodiment of the waste incineration heat conversion system shown in FIG. 12.
Figure 15:
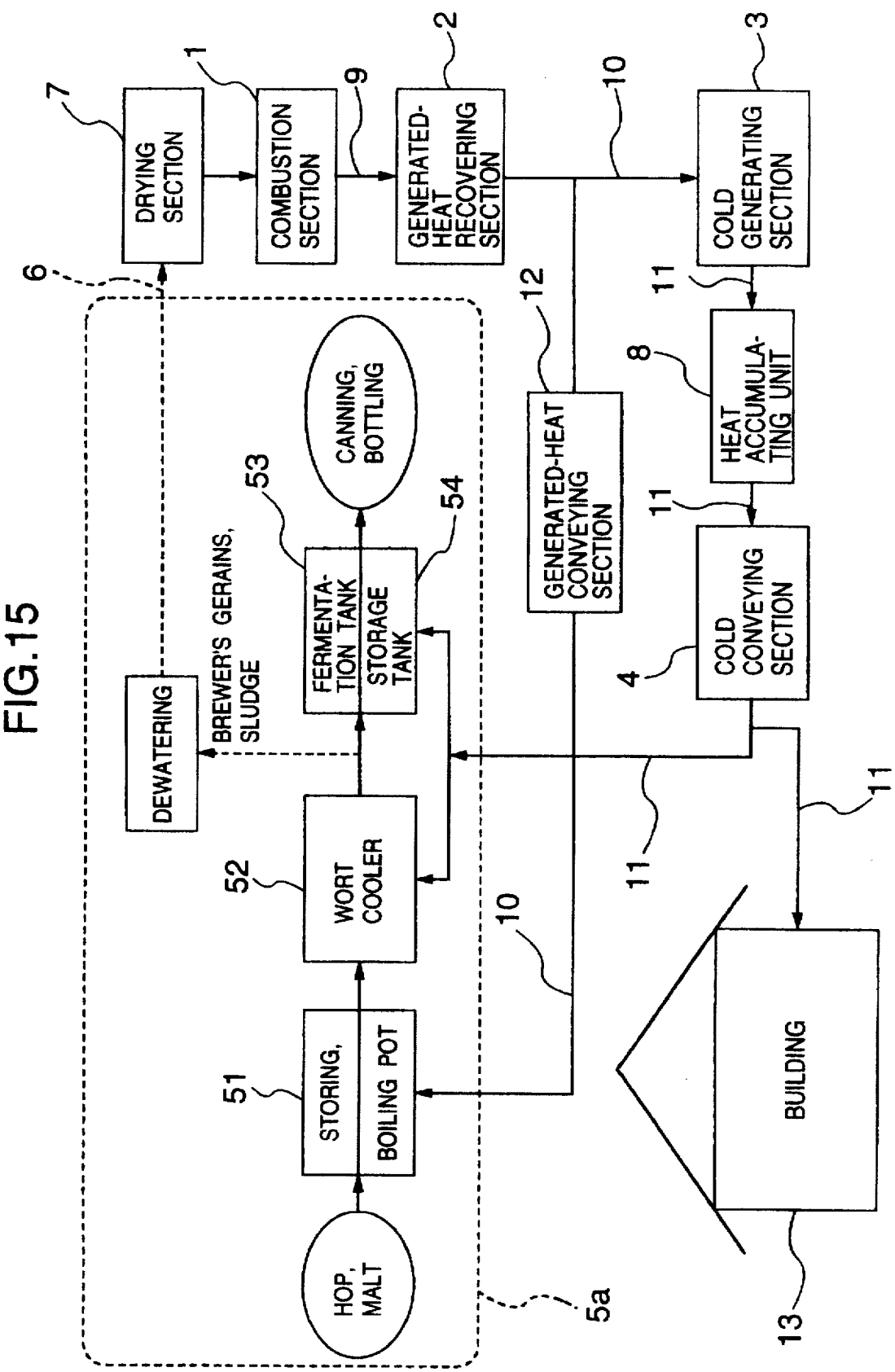
FIG. 15 shows a further modification to the embodiment of the waste incineration heat conversion system shown in FIG. 12.

Moreover, a description will be made hereinbelow of a third embodiment of this invention in conjunction with FIGS. 12 to 15. FIG. 12 shows an arrangement of a waste incineration heat conversion system according to this embodiment which is applied to a beer manufacturing process 5a, FIG. 13 is an illustration of another arrangement for the beer manufacturing process 5a, and FIGS. 14 and 15 show further arrangements suitable for the beer manufacturing and cooling process 5a.

In the beer manufacturing process, as shown in FIG. 12, hops and malts are boiled in a storing or boiling pot 51 so as to be saccharized to turn into wort with a bitter component contained therein. This wort is cooled in a cooler 52, fermentated in a fermentation tank 53, stored in a storage tank 53 for aging purpose, and then packed in cans and bottles so as to be put as canned beers and bottled beers on the market. The brewer's grains and sludge produced in the manufacturing process are dried into combustible wastes 6 in the drying section 7 and then incinerated in the combustion section 1. Heat 9 generated in the combustion section 1 is recovered as a thermal energy 10 in the generated-heat recovering section 2 and used as a driving energy for the cold generating section 3. The cold 11 generated in the cold generating section 3 is transferred through the heat accumulating section 8 to the product manufacturing process 5a by means of the cold conveying section 4. In the product manufacturing process 5a, the cold 11 is used for cooling the wort cooler 52, the fermentation tank 53 and the storage tank 54.

Due to the provision of the aforementioned waste incineration heat conversion system in the beer manufacturing process 5a, the combustible wastes such as brewer's grains and sludge exhausted from the beer manufacturing process and recovered, which have heretofore been merely subjected to incineration disposal, can be combusted, with the result that the heat generated by the combustion of the combustible wastes can be recovered to produce the cold for the cooling of the wort cooler 52, the fermentation tank 53 and the storage tank 54 in the manufacturing process. Accordingly, this system not only allows the disposal of the industrial wastes, but also realizes the energy savings in the beer manufacturing process.

Figure 13:
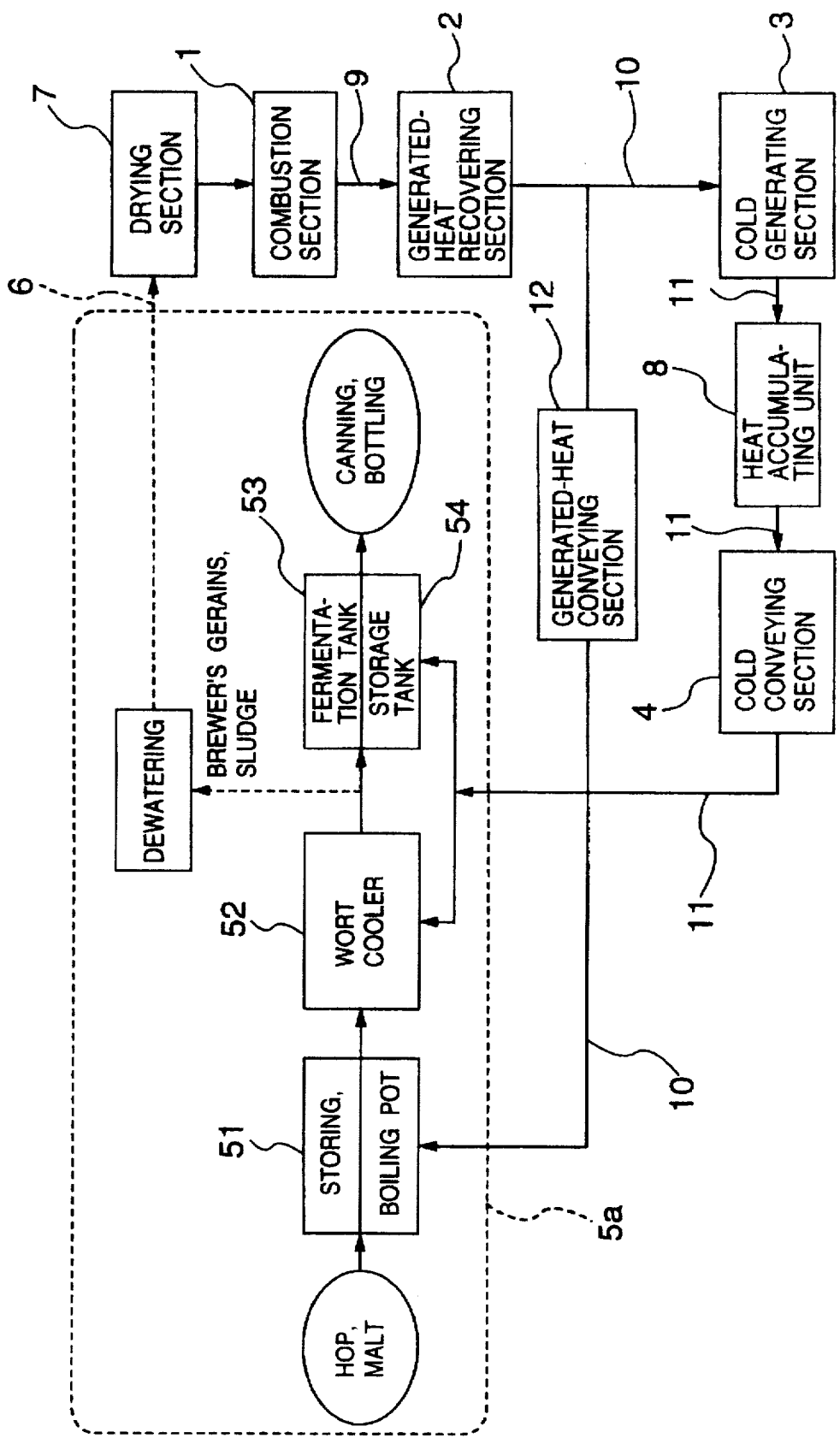
FIG. 13 shows a modification to the embodiment of the waste incineration heat conversion system shown in FIG. 12.

FIG. 13 illustrates a modification to the embodiment shown in FIG. 12. The difference from the FIG. 12 arrangement is that a part of the heat recovered in the generated-heat recovering section 2 is delivered through a generated-heat conveying section 12 to the product manufacturing process 5 so as to be used for heating the storing or boiling pot 51. This arrangement can perform the heating of the storing or boiling pot 51 by utilization of a part of the heat recovered in the generated-heat recovering section 2, thereby contributing to further energy savings.

FIG. 14 shows a further modification to the embodiment shown in FIG. 12. This modification is characterized in that a part of the cold 11 transferred through the cold conveying section 4 is fed to a building 13 such as an office building so as to be used for cooling thereof. This arrangement can achieve the energy savings of not only the product manufacturing process 5 and but also an air-conditioning system in the office.

FIG. 15 is an illustration of a still further modification to the arrangement shown in FIG. 12. A different point of this arrangement is that a part of the heat recovered in the generated-heat recovering section 2 is transferred through the generated-heat conveying section 12 into the product manufacturing process 5 so as to be used for heating the storing or boiling pot 51 and, in addition, a part of the cold 11 transferred through the cold conveying section 4 is fed to a building 13 such as an office building so as to be used for cooling thereof. This arrangement is particularly effective if the heat generated by the combustion of the combustible wastes 6 is of a large amount and can accomplish the energy savings of not only the product manufacturing process 5 but also the air-conditioning system in an office or the like.

Furthermore, a description will be made hereinbelow, with reference to FIGS. 16 and 17, of a fourth embodiment of this invention.

Figure 16:
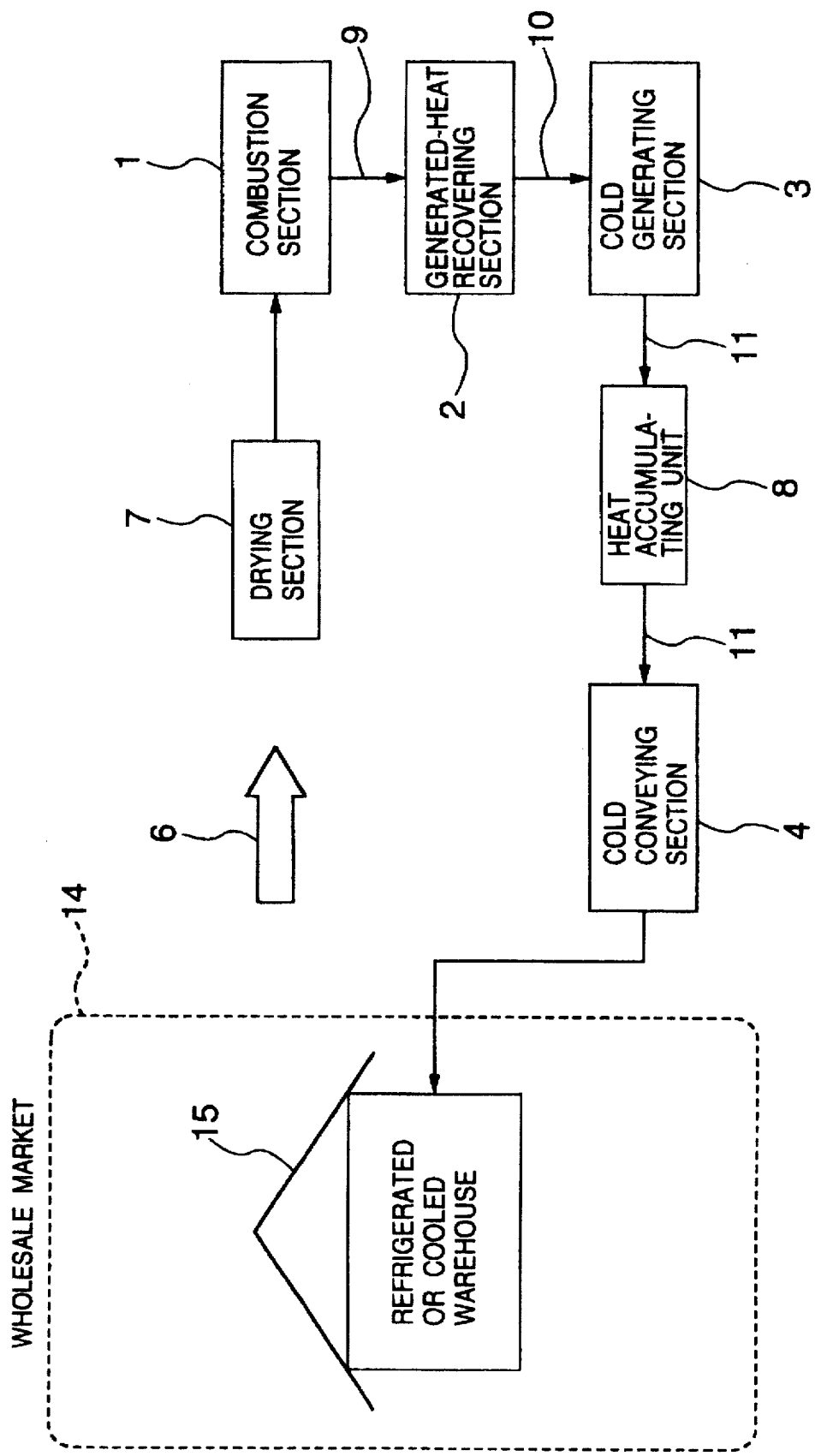
FIG. 16 is a diagrammatic illustration of a fourth embodiment of the waste incineration heat conversion system according to the present invention.

FIG. 16 is an illustration of an example of wholesale markets dealing with vegetable, fruits, marine products, fresh and meat. These wholesale markets produce a large amount of combustible wastes 6 including vegetables, fruits, fish, meat and others. The combustible wastes 6 are dried in the drying section 7 and then incinerated in the combustion section 1. The heat 9 generated in the combustion section 1 is recovered as a thermal energy 10 in the generated-heat recovering section 2 so as to be used as a driving energy for the cold generating section 3. On the other hand, the cold 11 generated in the cold generating section 3 is transferred, by the help of the cold conveying section 4, through the heat accumulating section 8 into a refrigerated or cooled warehouse 15 for keeping the foods frozen and cooled. This arrangement can utilize the combustible wastes 6, which have heretofore been disposed of or merely incinerated, to allow the foods to be kept in the frozen or cooled condition, thus realizing the energy savings in the wholesale markets.

Moreover, as shown in FIG. 17 the combustible wastes 6 such as vegetables, fruits, fish, and fresh meat exhausted from the wholesale markets are dried in the drying section 7 and then incinerated in the combustion section 1 to generate heat which in turn, is recovered as a thermal energy 10 in the generated-heat recovering section 2 so as to be used as a driving energy for the cold generating section 3. Further, a part of the cold 11 generated in the cold generating section 3 can be transferred through the cold conveying section 4 to an office 16 so as to be used for cooling thereof. This arrangement can utilize the combustible wastes 6, which have heretofore been disposed of or merely incinerated, to allow the foods to be kept in the frozen or cooled condition and to simultaneously permit cooling the office 16, thus realizing the energy savings in the wholesale markets.

As described above, according to this invention, the combustible wastes exhausted from a product manufacturing process and recovered, which have heretofore been disposed of or merely incinerated, can be incinerated so that the heat generated by the combustion of the combustible wastes is recovered to generate the cold, with the result that the generated cold can be used in the manufacturing process. Accordingly, in addition to disposing of the industrial wastes, it is possible to save the energy in the product manufacturing process.

In addition, in a case where the system according to this invention is applied to a food manufacturing process, since the combustible wastes exhausted from the product manufacturing process or the like contain as large as 70 to 80% of water even after the wastes are dewatered, the drying section provided upstream of the combustion section can dry the combustible wastes before the wastes are fed to the combustion section, to thereby increase the quantity of the heat to be generated in the combustion section and hence to increase the quantity of the cold generated.

Furthermore, in the case where the system of the invention is applied to wholesale markets treating vegetables, fruits, marine products, fresh meat and so on, the system according to this invention utilizes the combustible wastes, which have heretofore been disposed of or merely incinerated, to obtain energy needed to drive the device for generating cold required to keep the foods in a frozen or cooled condition, which can achieve the energy savings in the wholesale markets.

Moreover, a part of the thermal energy generated by the incineration of the combustible wastes can be fed to a section where thermal energy is needed in the product manufacturing process. In addition, in the case where the thermal energy generated by the incineration of the combustible wastes is relatively excessive, a part of the thus generated thermal energy can be fed through a generated-heat conveying section to the product manufacturing process and, in addition, a part of the cold generated in the cold generating section can be supplied through the cold conveying section to a building for cooling thereof.

What is claimed is:

1. A waste incineration heat conversion system for use with an installation in which combustible waste is produced, said system comprising:
   means for burning combustible waste discharged from said installation;
   means for recovering the heat generated by combustion of the combustible waste;
   means for generating cold by utilizing at least a part of the thus recovered heat; and
   means for conveying at least a part of the thus generated cold to a part of said installation so that the thus conveyed cold is used in said installation for a purpose.

2. The waste incineration heat conversion system according to claim 1, wherein the combustible waste is produced in a product manufacturing step carried out in said installation and wherein the cold thus conveyed to said installation is used to cool products produced in said product manufacturing step.

3. The waste incineration heat conversion system according to claim 1, wherein said installation is a brewing plant and said combustible waste comprises combustible brewer's grains and sludge discharged from the brewing plant, and wherein means for drying said waste is disposed upstream of said waste burning means and the cold conveyed to said brewing plant is utilized to cool at least one of wort cooler, fermentation tank and beer storage tank of said plant.

4. The waste incineration heat conversion system according to claim 1, wherein said installation is a market building in which at least one kind of vegetable and fruits, marine products, and flesh and meat is sold and said combustible waste comprises remainders in the market, and wherein means for drying said waste is disposed upstream of said waste burning means and the cold conveyed to said market building is utilized to cool food in at least one refrigerator in said market building.

5. The waste incineration heat conversion system according to claim 1, wherein the combustible waste is produced in a product manufacturing step carried out in said installation and said cold generating means generates the cold of a temperature not higher than 5° C. and wherein the cold thus conveyed to said installation is used to cool sections of said installation at different temperature levels.

6. The waste incineration heat conversion system according to claim 1, wherein the combustible waste is produced in a product manufacturing step carried out in said installation and said cold generating means generates the cold of a temperature not higher than 0° C. and wherein the cold thus conveyed to said installation is used to cool sections of said installation at different temperature levels.

7. The waste incineration heat conversion system according to claim 1, further including means disposed upstream of said waste burning means for drying said waste.

8. The waste incineration heat conversion system according to claim 1, further including means disposed downstream of said cold generating means for accumulating the cold generated by said cold heat generating means.

9. The waste incineration heat conversion system according to claim 1, wherein said heat recovering means comprises a boiler operative to generate steam and said cold generating means comprises a steam turbine driven by the thus generated steam and a turbo refrigerator driven by said steam turbine.

10. The waste incineration heat conversion system according to claim 1, wherein said cold generating means comprises an absorption type refrigerating machine operative with a refrigerant formed by ammonia.

11. The waste incineration heat conversion system according to claim 1, wherein said cold generating means comprises an absorption type refrigerating machine operative with an HFC based refrigerant.

12. The waste incineration heat conversion system according to claim 1, wherein said cold generating means comprises an absorption type refrigerating machine operative with a refrigerant formed by a mixture of water and lithium bromide.

13. The waste incineration heat conversion system according to claim 1, wherein said cold generating means comprises an adsorption type refrigerating machine.

14. The waste incineration heat conversion system according to claim 1, wherein said cold generating means comprises an adsorption type refrigerating machine operative with an adsorbent formed by one of silica gel and zeolite and a refrigerant formed by ethanol.

15. The waste incineration heat conversion system according to claim 12, wherein said absorption type refrigerating machine includes an absorber containing a solution of lithium bromide, an evaporator containing water as a refrigerant, and means including a solution pump for pumping the solution of lithium bromide from said absorber to an inlet of said evaporator so that the lithium bromide solution is mixed with the water in said evaporator to lower the freezing point of said refrigerant.

16. The waste incineration heat conversion system according to claim 2, wherein said product manufacturing step is a step of manufacturing foodstuff.

17. The waste incineration heat conversion system according to claim 1, wherein said cold heat conveying means is structured to convey a part of the cold generated by said cold generating means to a part of said installation and convey the rest of the cold generated by said cold heat generating means to another part of said installation so that the thus conveyed parts of the cold heat are used for different purposes.

18. The waste incineration heat conversion system according to claim 1, wherein said cold generating means utilizes a part of the heat recovered by said heat recovering means and a heat conveyor is provided to convey the rest of the heat recovered by said heat recovering means to said installation.

* * * * *